US008394499B2

(12) United States Patent
Jen et al.

(10) Patent No.: US 8,394,499 B2
(45) Date of Patent: Mar. 12, 2013

(54) CROSSLINKABLE POLYMER HOST HAVING PENDANT NONLINEAR OPTICAL CHROMOPHORES AND CONTAINING A NONLINEAR OPTICAL CHROMOPHORE GUEST

(75) Inventors: Kwan-Yue Jen, Kenmore, WA (US); Jingdong Luo, Seattle, WA (US); Tae-Dong Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 1192 days.

(21) Appl. No.: 11/952,737

(22) Filed: Dec. 7, 2007

(65) Prior Publication Data

US 2009/0148717 A1 Jun. 11, 2009

(51) Int. Cl.
*B32B 9/04* (2006.01)
*B32B 27/00* (2006.01)
(52) U.S. Cl. .................. 428/411.1; 428/473.5; 428/500
(58) Field of Classification Search .................. None
See application file for complete search history.

(56) References Cited

U.S. PATENT DOCUMENTS

| | | | |
|---|---|---|---|
| 3,435,003 A | 3/1969 | Craven | |
| 5,046,800 A | 9/1991 | Blyler | |
| 5,156,774 A | 10/1992 | Leising | |
| 5,290,630 A | 3/1994 | Devonald | |
| 5,432,286 A | 7/1995 | Cabrera | |
| 5,447,662 A | 9/1995 | Herr | |
| 5,484,821 A | 1/1996 | Mandal | |
| 5,489,451 A | 2/1996 | Omeis | |
| 5,514,799 A | 5/1996 | Varanasi | |
| 5,676,884 A | 10/1997 | Tiers | |
| 5,679,763 A | 10/1997 | Jen | |
| 5,693,734 A | 12/1997 | Herzig | |
| 5,708,178 A | 1/1998 | Ermer | |
| 5,718,845 A | 2/1998 | Drost | |
| 5,736,592 A | 4/1998 | DeMeuse | |
| 5,738,806 A | 4/1998 | Beckmann | |
| 5,776,374 A | 7/1998 | Newsham | |
| 5,804,101 A | 9/1998 | Marder | |
| 5,808,100 A | 9/1998 | Momoda | |
| 5,911,018 A | 6/1999 | Bischel | |
| 5,990,267 A | 11/1999 | McNutt | |
| 6,049,641 A | 4/2000 | Deacon | |
| 6,067,186 A | 5/2000 | Dalton | |
| 6,090,332 A | 7/2000 | Marder | |
| 6,184,540 B1 | 2/2001 | Chmii | |
| 6,211,374 B1 | 4/2001 | Ippoliti | |
| 6,281,366 B1 | 8/2001 | Frigoli | |
| 6,348,992 B1 | 2/2002 | Zhang | |
| 6,361,717 B1 | 3/2002 | Dalton | |
| 6,444,830 B1 | 9/2002 | He | |
| 6,448,416 B1 | 9/2002 | He | |
| 6,584,266 B1 | 6/2003 | He | |
| 6,652,779 B1 | 11/2003 | Zhang | |
| 6,716,995 B2 | 4/2004 | Huang | |
| 6,750,603 B2 * | 6/2004 | Huang et al. ............. | 313/483 |
| 7,014,796 B2 | 3/2006 | Jen | |
| 7,029,606 B2 | 4/2006 | Dalton | |
| 7,101,957 B2 | 9/2006 | Huang | |
| 7,144,960 B2 | 12/2006 | Jen | |
| 7,346,259 B1 | 3/2008 | Jen | |
| 2002/0065896 A1 | 5/2002 | Burakoff | |
| 2002/0084446 A1 | 7/2002 | Dalton | |
| 2004/0028369 A1 | 2/2004 | Aylward | |
| 2004/0266954 A1 | 12/2004 | Jen | |

FOREIGN PATENT DOCUMENTS

| | | |
|---|---|---|
| WO | WO 00/09613 A2 | 2/2000 |
| WO | WO 01/53746 A1 | 7/2001 |
| WO | WO 01/56462 A1 | 8/2001 |
| WO | WO 01/77749 A1 | 10/2001 |
| WO | WO 01/79750 A1 | 10/2001 |
| WO | WO 02/08215 A1 | 1/2002 |
| WO | WO 02/14305 A2 | 2/2002 |
| WO | WO 02/29488 A1 | 4/2002 |
| WO | WO 02/37173 A2 | 5/2002 |
| WO | WO 2004/065384 A1 | 8/2004 |
| WO | WO 2004/065615 A2 | 8/2004 |

OTHER PUBLICATIONS

Bosman, A.W., et al., "About Dendrimers: Structure, Physical Properties, and Applications," *Chemical Reviews* 99(7):1665-1688, Jul. 1999.
Carrillo, J.R., et al., "The Effect of Focused Microwaves on the Reaction of Ethyl *N*-Trichloroethylidenecarbamate With Pyrazole Derivatives," *Tetrahedron* 55(31):9623-9630, Jul. 1999.
Chen, X., et al., "A Thermally Re-Mendable Cross-Linked Polymeric Material," *Science* 295(5560):1698-1702, Mar. 2002.
Chen, X., et al., "New Thermally Remendable Highly Cross-Linked Polymeric Materials," *Macromolecules* 36(6):1802-1807, 2003.
Chujo, Y., et al., "Reversible Gelation of Polyoxazoline by Means of Diels—Alder Reaction," *Macromolecules* 23(10):2636-2641, 1999.
Dalton, L., "Polymeric Electro-Optic Materials: Optimization of Electro-Optic Activity, Minimization of Optical Loss, and Fine-Tuning of Device Performance," *Optical Engineering* 39(3):589-595, Mar. 2000.
Dalton, L.R., et al., "From Molecules to Opto-Chips: Organic Electro-Optic Materials," *Journal of Materials Chemistry* 9:1905-1920, 1999.
Gheneim, R., et al., "Diels—Alder Reactions With Novel Polymeric Dienes and Dienophiles: Synthesis of Reversibly Cross-Linked Elastomers," *Macromolecules* 35(19):7246-7253, 2002.
Goiti, E., et al., "Some Observations on the Copolymerization of Styrene With Furfuryl Methacrylate," *Polymer* 42(26):10187-10193, Dec. 2001.
Goiti, E., et al., "Thermal Breakdown by the Retro Diels—Alder Reaction of Crosslinking in Poly[styrene-*co*-(furfuryl methacrylate)]," *Macromolecular Rapid Communications* 24(11):692-696, 2003.

(Continued)

*Primary Examiner* — Sheeba Ahmed
(74) *Attorney, Agent, or Firm* — Christensen O'Connor Johnson Kindness PLLC (57) ABSTRACT

Crosslinked films having electro-optic activity, methods for making the films, polymers useful in making the films, and devices that include the films. The films include a host crosslinked polymer having aligned polarizable chromophore moieties and aligned guest polarizable chromophore compounds.

12 Claims, 7 Drawing Sheets

OTHER PUBLICATIONS

Goussé, C., et al., "Application of the Diels—Alder Reaction to Polymers Bearing Furan Moieties. 2. Diels—Alder and Retro-Diels—Alder Reactions Involving Furan Rings in Some Stryrene Copolymers," *Macromolecules* 31(2):314-321, 1998.

Haller, M., et al., "A Novel Lattice-Hardening Process to Achieve Highly Efficient and Thermally Stable Nonlinear Optical Polymers," *Macromolecules* 37(3):688-690, 2004.

He, M., et al., "Synthesis of Chromophores With Extremely High Electro-Optic Activity. 1. Thiophene-Bridge-Based Chromophores," *Chemical Materials* 14(11):4662-4668, 2002.

Jen, A., et al., "Exceptional Electro-Optic Properties Through Molecular Design and Controlled Self-Assembly," in M. Eich (ed.), *Linear and Nonlinear Optics of Organic Materials V* (Denver, Colo., Aug. 2-4, 2005), *Proceedings of SPIE, the Int'l Society for Optical Engineering* 5935:593506-1-593506-13, 2005.

Kim, T.-D., et al., "A Novel Approach to Achieve Highly Efficient Nonlinear Optical Polymers From Guest-Host Systems," in M. Eich (ed.), *Linear and Nonlinear Optics of Organic Materials V* (Denver, Colo., Aug. 2-4, 2005), *Proceedings of SPIE, the Int'l Society for Optical Engineering* 5935:593505-1-593505-13, 2005.

Kim, T.-D., et al., "New Paradigm for Ultrahigh Electro-Optic Activity: Through Supramolecular Self-Assembly and Novel Lattice Hardening," in J.G. Grote et al. (eds.), *Organic Photonic Materials and Devices IX* (San Jose, Calif., Jan. 21-24, 2007), *Proceedings of SPIE, the Int'l Society for Optical Engineering* 6470:64700D-1-64700D-14, 2007.

Kim, T.-D., et al., "Ultralarge and Thermally Stable Electro-Optic Activities from Diels—Alder Crosslinkable Polymers Containing Binary Chromophore Systems," *Advanced Materials* 18(22):3038-3042, 2006.

Kwart, H., and K. King, "The Reverse Diels—Alder or Retrodiene Reaction," *Chemical Reviews* 68(4):415-447, Aug. 1968.

Liu, S., et al., "Focused Microwave-Assisted Synthesis of 2,5-Dihydrofuran Derivatives as Electron Acceptors for Highly Efficient Nonlinear Optical Chromophores," *Advanced Materials* 15(7-8):603-607, 2003, retrieved from Caplus as 2003: 338986.

Luo, J., et al., "Design, Synthesis, and Properties of Highly Efficient Side-Chain Dendronized Nonlinear Optical Polymers for Electro-Optics," *Advanced Materials* 14(23):1763-1768, Dec. 2002.

Luo, J., et al., "Recent Progress in Developing Highly Efficient Nonlinear Optical Chromophores and Side-Chain Dendronized Polymers for Electro-Optics," in J. Grote and T. Kaino (eds.), *Organic Photonic and Devices V* (San Jose, Calif., Jan. 25-31, 2003) *Proceedings of SPIE, the International Society for Optical Engineering* 4491(53):520-529, 2003, retrieved from Caplus as 2003:632269.

Luo, J., et al., "Highly Efficient and Thermally Stable Electro-Optic Polymer From a Smartly Controlled Crosslinking Process," *Advanced Materials* 15(19):1635-1638, Oct. 2003.

Ma, H., et al., "Polymer-Based Optical Waveguides: Materials, Processing, and Devices," *Advanced Materials* 14(19):1339-1365, Oct. 2002.

McElhanon, J.R., and D.R. Wheeler, "Thermally Responsive Dendrons and Dendrimers Based on Reversible Furan-Maleimide Diels—Alder Adducts," *Organic Letters* 3(17):2681-2683, 2001.

Melikian, G., et al., "Synthesis of Substituted Dicyanomethylendihydrofurans," *Synthetic Communications* 25(19):3045-3051, 1995.

Villemin, D., and L. Liao, "Rapid and Efficient Synthesis of 2[3-Cyano-4-(2-Aryliden)-5, 5-Dimethyl-5h-Furan-2-Ylidene]-Malononitrile Under Focused Microwave Irradiation," *Synthetic Communications* 31(11):1771-1780, 2001.

Yoon, S.S., and W.C. Still, "Sequence-Selective Peptide Binding With a Synthetic Reception," *Tetrahedron* 51(2):567-578, 1995.

Zhang, C., et al., "A Novel Trilinkable High $\mu\beta$ NLO Chromophore for Polymeric Electro-Optic Material With Enhanced Thermal Stability," Polymer Preprints (*American Chemical Society, Division of Polymer Chemistry*) 40(1):156-157, 1999, retrieved from Caplus as 1999: 211124.

* cited by examiner

CROSSLINKABLE POLYMER HOST HAVING PENDANT NONLINEAR OPTICAL CHROMOPHORES AND CONTAINING A NONLINEAR OPTICAL CHROMOPHORE GUEST

BACKGROUND OF THE INVENTION

Organic second-order nonlinear optical (NLO) materials have received increasing interest due to their promising application in high-speed electro optic (E-O) devices with very broad bandwidth and low driving voltages. One of the most challenging tasks in this area is to effectively translate high molecular nonlinearities ($\mu\beta$) into large macroscopic E-O activities ($r_{33}$) in a bulk system. To realize large $r_{33}$ values, research has been directed toward making chromophores with large dipole moments $\mu$ and first hyperpolarizabilities $\beta$, increasing loading density of chromophores in a host polymer, and improving poling efficiency.

Recent theoretical analysis has shown that dipole-dipole interactions between chromophores make it impossible to achieve a high degree of noncentrosymmetric order unless undesirable anisotropic intermolecular electrostatic interactions are minimized by steric shape modification of chromophores. A spherical shape has been proposed as means to increase loading density and improve poling efficiency. Dendritic chromophores, NLO dendrimers, and dendronized E-O polymers have recently been developed to isolate the interactions between chromophores and polymers. In comparison with conventional E-O polymers, the screening effect of dendrons allows the chromophores to be spatially isolated, and larger void-containing structures can provide space for efficient reorientation of the chromophores. Furthermore, the globular geometry of dendrimers is well suited for shape modification of chromophores. Although these chromophores have shown encouraging results in improving poling efficiency, pushing the loading density above a certain level (25 to 30 wt %) often results in micro-aggregation and phase separation due to limited miscibility and an incompatibility between chromophores and polymers.

Despite the advances in the development of NLO materials noted above, there exists a need for improved materials and methods. The present invention seeks to fulfill this need and provides further related advantages.

SUMMARY OF THE INVENTION

The present invention provides crosslinked films having electro-optic activity, methods for making the films, polymers useful in making the films, and devices that include the films.

In one aspect, the invention provides a method for making a crosslinked film having electro-optic activity. In one embodiment, the method includes applying a crosslinking agent, a polarizable chromophore compound, and a crosslinkable polymer having a plurality of polarizable chromophore moieties to a substrate to provide a film; subjecting the film to an electric field to align at least a portion of the chromophore compounds and polarizable chromophore moieties to provide a film containing aligned chromophore compounds and aligned polarizable chromophore moieties; and heating the film containing aligned chromophore compounds and aligned polarizable chromophore moieties to a temperature sufficient to crosslink the polymer and the crosslinking agent to provide a crosslinked film having electro-optic activity.

In another aspect of the invention, films having electro-optic activity are provided. In one embodiment, the film includes aligned, polarizable chromophore guest compounds and a host matrix having aligned polarizable chromophore moieties.

In another aspect of the invention, crosslinkable polymers are provided. In one embodiment, the crosslinkable polymer has one or more chromophore groups attached as pendants to a polymer backbone and one or more of either diene or dienophile groups attached as pendants to the polymer backbone, where the diene or dienophile groups are reactive to form 4+2 cycloaddition products.

In another aspect of the invention, crosslinked polymers are provided. In one embodiment, the crosslinked polymer has one or more chromophore groups attached as pendants to a crosslinkable polymer and one or more crosslinks formed by the 4+2 cycloaddition reaction of a diene and a dienophile, where the cycloaddition moieties are formed by the reaction of one or more diene or dienophile moieties of a crosslinkable polymer and one or more diene or dienophile moieties of a crosslinking agent.

In another aspect, the invention provides electro-optic devices that include the films described above.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

The present invention provides crosslinked films having electro-optic (E-O) activity, methods for making the films, polymers useful in making the films, and devices that include the films. The films of the invention include two active components: (1) crosslinked polymers having a plurality of polarizable chromophore moieties and (2) nonlinear optically active (polarizable) chromophore compounds. The crosslinked polymers having a plurality of polarizable chromophore moieties serve as a host for the guest chromophore compounds. The guest chromophore compounds and the polarizable chromophore moieties impart electro-optic activity to the film after being aligned, typically by electrostatic poling. The crosslinked polymers having a plurality of polarizable chromophore moieties act to preserve the alignment of the chromophore compounds in the film after poling by restricting relaxation of the chromophore compounds, thereby preserving the film's electro-optic activity, and additionally provide enhanced electro-optic activity through the polarizable chromophore moieties.

In one aspect, the invention provides a method for making a crosslinked film having electro-optic activity. In one embodiment, the method includes the following steps:

(1) applying a crosslinking agent, a polarizable chromophore compound, and a crosslinkable polymer having a plurality of polarizable chromophore moieties to a substrate to provide a film;

(2) subjecting the film to an electric field to align at least a portion of the chromophore compounds and at least a portion of the polarizable chromophore moieties to provide a film containing aligned chromophore compounds and aligned polarizable chromophore moieties; and (3) heating the film containing aligned chromophore compounds and aligned polarizable chromophore moieties to a temperature sufficient to crosslink the polymer and the crosslinking agent to provide a crosslinked film having electro-optic activity.

In one embodiment, the crosslinking agent, polarizable chromophore compound, and crosslinkable polymer having a plurality of polarizable chromophore moieties are applied to the substrate as a blend by spin coating.

In the method, the crosslinking agent and crosslinkable polymer having a plurality of polarizable chromophore moieties are reactive to form crosslinks. Suitable crosslinking agents are polyfunctional crosslinking agents including two or more crosslinkable groups. Suitable crosslinking agents include bifunctional and trifunctional crosslinking agents. The crosslinking agents include functional groups that allow for crosslinking with the crosslinkable polymer. The crosslinking agents do not contain chromophores.

Figure 1:
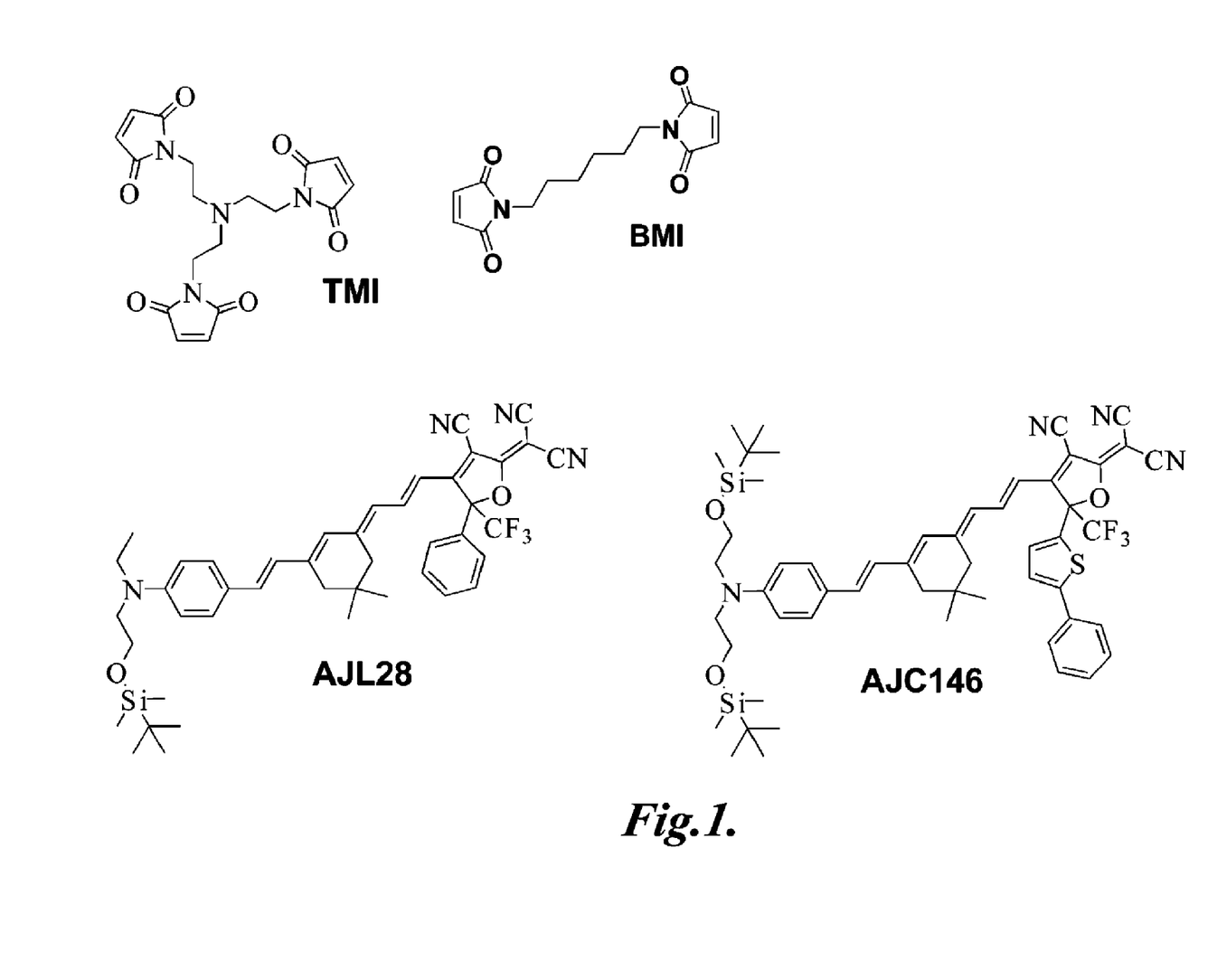
FIG. 1 is a schematic illustration of representative crosslinking agents and representative guest chromophore compounds useful in the invention.

The crosslinkable polymer having a plurality of polarizable chromophore moieties and crosslinking agent are reactive to form 4+2 cycloaddition product crosslinks. In this embodiment, the crosslinkable groups are dienes and dienophiles. In one embodiment, the crosslinkable polymer includes one or more dienes (e.g., a plurality of dienes) for reaction with a crosslinking agent that includes two or more dienophiles. Alternatively, the crosslinkable polymer includes one or more dienophiles (e.g., a plurality of dienophiles) for reaction with a crosslinking agent that includes two or more dienes. In one embodiment, the crosslinking agent includes two or more dienophiles. Representative crosslinking agents include bismaleimides (e.g., BMI) and trismaleimides (e.g., TMI), as illustrated in FIG. 1. In one embodiment, the crosslinkable polymer includes one or more dienes. Representative diene moieties include anthracene moieties.

In one embodiment, the crosslinkable polymer is a graft copolymer having one or more dienes.

In one embodiment, the crosslinkable polymer includes from about 0.01 to about 1 percent by weight (wt %) diene based on the total weight polymer.

A representative crosslinkable polymer useful in the method of the invention is a copolymer polymethylmethacrylate-co-9-anthrylmethyl methacrylate (PMMA-AMA) prepared by copolymerizing 9-anthrylmethyl methacrylate (AMA) and methylmethacrylate (MA). The preparation of PMMA-AMA is described in the Example.

The crosslinkable polymer includes one or more polarizable chromophore moieties (e.g., a plurality of polarizable chromophore moieties). Representative crosslinkable polymers include graft copolymers having pendant chromophore moieties. The crosslinkable polymers that include a chromophore moiety have from about 5 to about 30 wt % (or from about 3 to 15 percent by molar percentage) chromophore moiety based on the total weight of the polymers. The chromophore moiety is pendant to the polymer chain and does not include a crosslinkable moiety (e.g., diene or dienophile).

Films of the invention have large E-O activity due to both the degree of total chromophore content and the unique use of crosslinking. Films of the invention have unexpectedly high E-O activity by increasing overall chromophore content. Having chromophores in both the host polymer matrix and guest components allows for the total chromophore loading of the film to be greatly increased without destroying the E-O activity with chromophore aggregation. Additionally, films of the invention have high E-O activity combined with high thermal stability by allowing the chromophores to align during poling with a minimum amount of interference from the matrix. In the method and film of the invention, there is no crosslinking or covalent coupling of the guest chromophore compound, and the pendant chromophore moiety is covalently coupled to the polymer backbone at one point (i.e., not included in the crosslinking of the film). The pendant chromophore moiety does not have a crosslinkable group. Minimum interference between matrix and chromophore alignment allows the chromophore compound and the chromophore moiety to freely rotate during poling. After alignment, the crosslinking process locks the chromophores into place without further affecting the order. If the chromophores were actually crosslinked into the matrix, the crosslinking process may disrupt the order created by poling.

The method of the invention provides a film having electro-optic activity. The electro-optic activity is imparted to the film by aligned, nonlinear optically active chromophore compounds present in the film and by polarizable chromophore moieties attached to the polymer chain (collectively "chromophores"). The guest chromophore compounds and the pendant chromophore moieties do not include a crosslinkable moiety and do not form covalent bonds with the host polymers of the film. The guest chromophores are a separate film component and reside in the polymer network of the host. The specific guest chromophore compounds and pendant chromophore moieties useful in the methods and films of the invention are not particularly critical. Suitable chromophores include compounds with large dipole moments $\mu$ and first hyperpolarizabilities $\beta$, high molecular nonlinearities ($\mu\beta$), which translate into large macroscopic E-O activities ($r_{33}$) in a bulk system. Representative guest chromophore compounds AJL28 and AJC146 are illustrated in FIG. 1. The preparation of a representative crosslinkable polymer that includes a chromophore moiety is described in the Example and illustrated in FIGS. 2-4.

The chromophores are second-order nonlinear optical chromophore compounds. As used herein, the term "chromophore" refers to a compound or a moiety that can absorb a photon of light. Thus, by virtue of the presence of one or more chromophore moieties, the polymers of the invention are chromophores. In the context of the chromophores useful in the invention, the term "nonlinear" refers second order effects that arise from the nature of the polarizable chromophore (i.e., "push-pull" chromophore) having the general structure D-$\pi$-A, where D is an electron donor, A is an electron acceptor, and $\pi$ is a $\pi$-bridge that conjugates the donor to the acceptor.

A "donor" (represented by "D") is an atom or group of atoms with low electron affinity relative to an acceptor (defined below) such that, when the donor is conjugated to an acceptor through a π-bridge, electron density is transferred from the donor to the acceptor.

An "acceptor" (represented by "A") is an atom or group of atoms with high electron affinity relative to a donor such that, when the acceptor is conjugated to a donor through a π-bridge, electron density is transferred from the acceptor to the donor.

A "π-bridge" or "conjugated bridge" (represented in chemical structures by "π" or "π$_n$" where n is an integer) is comprised of an atom or group of atoms through which electrons can be delocalized from an electron donor (defined above) to an electron acceptor (defined above) through the orbitals of atoms in the bridge. Preferably, the orbitals will be p-orbitals on multiply bonded carbon atoms such as those found in alkenes, alkynes, neutral or charged aromatic rings, and neutral or charged heteroaromatic ring systems. Additionally, the orbitals can be p-orbitals on multiply bonded atoms such as boron or nitrogen or organometallic orbitals. The atoms of the bridge that contain the orbitals through which the electrons are delocalized are referred to here as the "critical atoms." The number of critical atoms in a bridge can be a number from 1 to about 30. The critical atoms can also be substituted further with the following: "alkyl" as defined below, "aryl" as defined below, or "heteroalkyl" as defined below. One or more atoms, with the exception of hydrogen, on alkyl, aryl, or heteroalkyl substituents of critical atoms in the bridge may be bonded to atoms in other alkyl, aryl, or heteroalkyl substituents to form one or more rings.

"Alkyl" is a saturated or unsaturated, straight or branched, cyclic or multicyclic aliphatic (i.e., non-aromatic) hydrocarbon group containing from 1 to about 30 carbons. Independently the hydrocarbon group, in various embodiments: has zero branches (i.e., is a straight chain), one branch, two branches, or more than two branches; is saturated; is unsaturated (where an unsaturated alkyl group may have one double bond, two double bonds, more than two double bonds, and/or one triple bond, two triple bonds, or more than three triple bonds); is, or includes, a cyclic structure; is acyclic. Exemplary alkyl groups include $C_1$alkyl (i.e., —$CH_3$ (methyl)), $C_2$alkyl (i.e., —$CH_2CH_3$ (ethyl), —CH=$CH_2$ (ethenyl) and —C≡CH (etheynyl)) and $C_3$alkyl (i.e., —$CH_2CH_2CH_3$ (n-propyl), —$CH(CH_3)_2$ (i-propyl), —CH=CH—$CH_3$ (1-propenyl), —C≡C—$CH_3$ (1-propynyl), —$CH_2$—CH=$CH_2$ (2-propenyl), —$CH_2$—C≡CH (2-propynyl), —$C(CH_3)$=$CH_2$ (1-methylethenyl), —CH$(CH_2)_2$ (cyclopropyl), and adamantly. The term "alkyl" also includes groups where at least one of the hydrogens of the hydrocarbon group is substituted with at least one of the following: alkyl; "aryl" as defined below; or "hetereoalkyl" as defined below. One or more of the atoms in an alkyl group, with the exception of hydrogen, can be bonded to one or more of the atoms in an adjacent alkyl group, aryl group (aryl as defined below), or heteroalkyl group (heteroalkyl as defined below) to form one or more ring.

"Aryl" is a monocyclic or polycyclic aromatic ring system or a heteroaromatic ring system ("heteroaryl") containing from 3 to about 30 carbons. The ring system may be monocyclic or fused polycyclic (e.g., bicyclic, tricyclic, etc.). Preferred heteroatoms are nitrogen, oxygen, sulfur, and boron. In various embodiments, the monocyclic aryl ring is C5-C10, or C5-C7, or C5-C6, where these carbon numbers refer to the number of carbon atoms that form the ring system. A C6 ring system, i.e., a phenyl ring, is a preferred aryl group. A C4-S ring system (i.e., a thiophene) is another preferred aryl group. In various embodiments, the polycyclic ring is a bicyclic aryl group, where preferred bicyclic aryl groups are C8-C12, or C9-C10. A naphthyl ring, which has 10 carbon atoms, is a preferred polycyclic aryl group. The term "aryl" also includes groups where at least one of the hydrogens of the aromatic or heteroaromatic ring system is substituted further with at least one of the following: alkyl; halogen; or hetereoalkyl (as defined below). One or more of the atoms in an aryl group, with the exception of hydrogen, can be bonded to one or more of the atoms in an adjacent alkyl group, aryl group, or heteroalkyl group (heteroalkyl as defined below) to form one or more rings.

"Heteroalkyl" is an alkyl group (as defined herein) wherein at least one of the carbon atoms or hydrogen atoms is replaced with a heteroatom, with the proviso that at least one carbon atom must remain in the heteroalkyl group after the replacement of carbon or hydrogen with a heteroatom. Preferred heteroatoms are nitrogen, oxygen, sulfur, silicon, and halogen. A heteroatom may, but typically does not, have the same number of valence sites as the carbon or hydrogen atom it replaces. Accordingly, when a carbon is replaced with a heteroatom, the number of hydrogens bonded to the heteroatom may need to be increased or decreased to match the number of valence sites of the heteroatom. For instance, if carbon (valence of four) is replaced with nitrogen (valence of three), then one of the hydrogens formerly attached to the replaced carbon must be deleted. Likewise, if carbon is replaced with halogen (valence of one), then three (i.e., all) of the hydrogens formerly bonded to the replaced carbon must be deleted. Examples of heteroalkyls derived from alkyls by replacement of carbon or hydrogen with heteroatoms are shown immediately below. Exemplary heteroalkyl groups are methoxy (—$OCH_3$), amines (—$CH_2NH_2$), nitriles (—CN), carboxylic acids (—$CO_2H$), other functional groups, and dendrons. The term "heteroalkyl" also includes groups where at least one of the hydrogens of carbon or a heteroatom of the heteroalkyl may be substituted with at least one of the following: alkyl; aryl; and heteroalkyl. One or more of the atoms in a heteroalkyl group, with the exception of hydrogen, can be bonded to one or more of the atoms in an adjacent alkyl group, aryl group, or heteroalkyl group to form one or more rings.

Representative chromophores, donors, acceptors, and π-bridges are described in U.S. Pat. Nos. 6,361,717; 6,348,992; 6,090,332; 6,067,186; 5,708,178; and 5,290,630; each expressly incorporated herein by reference in its entirety. Representative chromophores are also described in WO 02/08215; U.S. patent application Ser. No. 10/212,473, filed Aug. 2, 2002; U.S. patent application Ser. No. 10/347,117, filed Jan. 15, 2003; and U.S. Provisional Patent Application No. 60/520,802, filed Nov. 17, 2003; Adv. Mater. 14(23): 1763-1768, 2002; and Adv. Mater. 14(19):1339-1365, 2002; each expressly incorporated herein by reference in its entirety.

In another aspect of the invention, films having electrooptic activity are provided. In one embodiment, the film includes aligned, polarizable chromophore guest compounds and a host matrix having aligned polarizable chromophore moieties. The host matrix includes crosslinked polymers having a plurality of polarizable chromophore moieties, and the crosslinked polymers include one or more 4+2 cycloaddition crosslinks.

As noted above, the film is made by crosslinking a crosslinkable polymer having a plurality of polarizable chromophore moieties with a crosslinking agent in the presence of nonlinear optically active chromophore compounds. The crosslinks are 4+2 cycloaddition product crosslinks that are the product of the reaction of a diene and a dienophile. In one embodiment, the diene is an anthracene and the dienophile is a maleimide.

In one embodiment, the crosslinked polymers are crosslinked PMMA-co-AMA copolymers.

In the films of the invention, the guest chromophore compounds are present in an amount from about 25 to about 50 wt % based on the total weight of the film. As noted above, the nature of the chromophore compound is not particularly critical and suitable chromophore compounds are described above.

Figure 5:
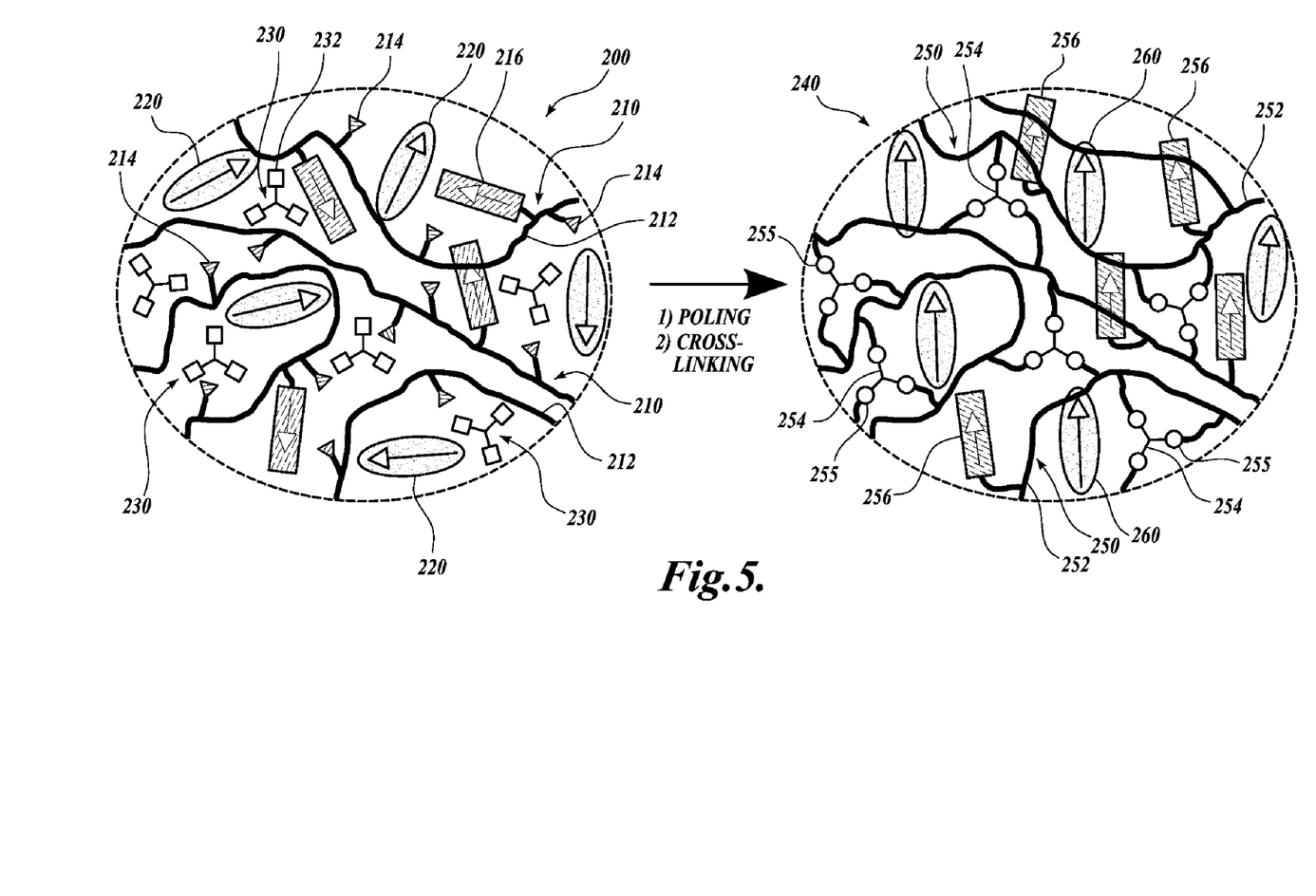
FIG. 5 is a schematic illustration of a representative method for making a crosslinked film of the invention.

The preparations of representative films of the invention are described in the Example and illustrated schematically in FIG. 5. The films have $r_{33}$ values from about 250 to about 380 pm/V.

FIG. 5 illustrates the formation of a representative film of the invention that includes chromophore moieties grafted onto the polymer backbone. The formed film 200 includes a polymer 210 having a backbone 212, pendant diene groups 214, and pendant chromophore groups 216. The film also includes chromophore compounds 220 and crosslinking agents 230. In this illustration, the representative crosslinking agents have three dienophile groups 232. After electrostatic poling and crosslinking, a representative crosslinked and poled film of the invention 240 is formed. The poled film includes crosslinked polymer 250 having a backbone 252; crosslinks 254 resulting from the reaction of diene groups 214 and the crosslinking agent dienophiles 232 to form 4+2 cycloaddition products 255; and aligned pendant chromophore groups 256. The poled film additionally includes aligned chromophore compounds 260.

Several factors are considered when making films of the invention. The composition of a film is determined by the amount of guest chromophore, polymer, and crosslinking agent. In a representative example, the guest chromophore is present in an amount from about 5 to about 50 wt %, the crosslinking agent is present in an amount from about 0.1 to about 1.0 wt %, and the remainder is polymer. The film components are dissolved in a solvent, typically in an amount from 1-20 wt % based on the total weight of solids. A representative solvent is 1,1,2-trichloroethane. The solution containing the dissolved mixture of polymer, chromophore, and crosslinking agent is then spin-coated onto a substrate. The spin-coating speed and the viscosity of the solution will determine the thickness of the film of the invention. The desired film thickness is determined by the final use for the film, and may range from about 100 nm to about 100 μm for typical applications.

For measurement of $r_{33}$, an ITO-coated glass substrate is typically used. The substrate used when fabricating electro-optic devices incorporating films of the invention, such as Mach-Zehnder interferometers, will typically be a cladding material having a lower refractive index than the film. The cladding material will typically be one layer of a multi-layer device that is based on a foundation substrate of silicon, quartz, or glass. Typical electro-optic (E-O) coefficient values are measured using the reflection technique at 1310 nm light according to Teng, C. C.; Man, H. T., *Appl. Phys. Lett.* 56:1734, 1990.

Films of the invention spin-coated on substrates are typically dried under vacuum in an oven. Typical drying times range from 1 hour to 48 hours and typical temperatures range from 30 to 150° C. The drying temperature and time will affect the E-O strength of the film because extensive crosslinking before poling will exclude the possibility of aligning the chromophores so as to produce a large E-O coefficient. Typical films of the invention are dried for a minimum amount of time and at a minimum temperature so as to adequately remove the solvent with minimal crosslinking. Drying factors are dictated by the solvent used and the film components. The use of an un-optimized process is expected to give low E-O activity due to premature crosslinking of the polymer before applying the poling field to the chromophores. To minimize the detrimental effect of crosslinking, poling is performed before the polymer film becomes substantially crosslinked. At higher temperature and longer vacuum drying times, the E-O activity of the polymers is significantly reduced due to crosslinking before reorientation of chromophores. For example, the $r_{33}$ value of a representative film after being dried at 50° C. for 10 hours is higher than a similar film after drying at 70° C. for 10 hours.

Crosslinking of the polymer in films of the invention typically proceeds in two stages: during drying (described above) and poling. Because crosslinking films of the invention typically is a temperature-driven process, drying the solution-deposited film typically begins the crosslinking process. Therefore, it is critically important that, during drying, a minimal amount of crosslinking occurs. Minimal crosslinking will typically allow for a maximum E-O activity of the final film because crosslinking of the film before poling will result in the guest chromophores being prematurely (i.e., before being aligned by poling) locked into place within the film.

Poling dried films is typically accomplished by electrostatic poling between two electrodes with the film intermediate. Corona (plasma-onset) poling is another poling technique useful for aligning chromophores in films of the invention. Electrostatic poling typically involves a film intermediate two electrodes. For electro-optic devices incorporating films of the invention, a cladding layer may be intermediate the film and one, or both, of the poling electrodes. Poling fields for electrostatic poling are typically from about 50 to about 150 V/μm. An inert environment (e.g., under nitrogen) is typically beneficial to the poling process.

After a poling field is applied, the chromophores in the film (both pendant and guest chromophores) are aligned in the direction of the field and crosslinking via elevated temperature locks the oriented chromophores into place. Optimizing the E-O effect of the film is typically accomplished by gradually raising the temperature of the film while poling, as well as raising the poling field along with the temperature. Representative poling procedures for making films of the invention include starting at a temperature of from about 50 to about 75° C. and ramping, over the course of 5 to 60 minutes, to from about 100 to about 150° C. Typical voltages are from about 40 to about 75 V/μm increasing to from about 75 to about 150 V/μm over the course of the temperature ramp. Upon completion of crosslinking, the poling voltage typically remains applied while the film gradually cools to room temperature.

In some embodiments, electro-optic films of the invention include at least two structurally different chromophores. The at least two structurally different chromophores may have different donors, different π-bridges, different acceptors, different substituents, or any combination thereof. The film is prepared from a crosslinkable polymer having a covalently attached chromophore moiety (e.g., a graft copolymer having a pendant chromophore moiety) that contains no crosslinking groups. The film further comprises a polarizable chromophore guest (e.g., a polarizable chromophore is a guest in a crosslinked polymer having a pendant chromophore moiety). The at least two structurally different chromophores may be present in the polymer both as guest chromophores, as a polymer having covalently attached chromophore moiety and a guest chromophore, or as two polymers having covalently attached chromophores. In one embodiment, the guest chromophore compounds are present in an amount from about 5 to about 50 wt % based on the total weight of the film. The crosslinkable host polymers that include a chromophore moiety have from about 5 to 30 wt % chromophore moiety based on the total weight of the polymers (or from 3 to 15 percent by molar percentage). When both guest chromophores and chromophores attached to the host polymer are present in a film of the invention, the amount of total chromophore in the film is typically from about 5 to about 60 wt % based on the total weight of the film.

The preparation of representative films of the invention from crosslinkable polymers having a covalently bonded chromophore moiety and a guest chromophore are described in the Example and illustrated schematically in FIG. 5. These films have $r_{33}$ values from about 250 to about 380 pm/V. The electro-optic properties and temporal stability of films of the invention prepared from crosslinkable polymers that include at least one polarizable guest chromophore are summarized in Table 1, with the structures of the polymer materials illustrated in FIG. 6. Representative crosslinkable polymers of the invention typically have from about 1 to about 20% diene pendant groups.

about 0.5-1.0 wt % for the Table 1 films, which is sufficient to provide crosslinking with the anthracenyl moieties. Therefore, for example, Film 5 will have the composition of PMAJL: AJL28: TMI=59:40:1.

In another aspect of the invention, crosslinkable polymers are provided. In one embodiment, the crosslinkable polymer essentially has one or more chromophore groups attached as pendants to a polymer backbone and one or more of either diene or dienophile groups attached as pendants to the polymer backbone, where the diene or dienophile groups are reactive to form 4+2 cycloaddition products. In one embodiment, the crosslinkable polymer has one or more diene groups attached as pendants. In one embodiment, the crosslinkable polymer has one or more dienophile groups attached as pendants.

In another aspect of the invention, crosslinked polymers are provided. In one embodiment, the crosslinked polymer essentially has one or more chromophore groups attached as pendants to a crosslinkable polymer and one or more crosslinks formed by the 4+2 cycloaddition reaction of a

TABLE 1

Electro-optic properties and temporal stability of representative films.

| Film Number | Polymer Host | Guest (AJL28 wt %) | Maleimide: Anthracene Ratio[1] | Tg (° C.) | $r_{33}$[2] (pm/V) | Thermal Stability[3] (%) | Loss[4] (dB/cm) |
|---|---|---|---|---|---|---|---|
| 1 | PMMA-AMA | 46 | 1:2 | — | 300 | — | — |
| 2 | PMAJNP | 50 | 1:2 | 130 | 330 | 58% after 300 hours | — |
| 3 | PMAJL | 50 | 1:2 | 170 | 380 | 58% after 300 hours | 1.8-3.0 |
| 4 | | | 1:1 | — | 340 | — | — |
| 5 | | 40 | 1:2 | 150 | 320 | 70% after 200 hours | — |
| 6 | | | 1:1 | 200 | 300 | 60% after 200 hours | 1.5-2.4 |
| 7 | | 30 | 1:2 | 160 | 300 | — | — |
| 8 | | | 1:1 | 180 | 270 | 58% after 280 hours | — |

[1]Molar ratio of maleimide to anthracene.
[2]Measured by simple reflection at 1.31 μm (Teng, C. C.; Man, H. T., Appl. Phys. Lett. 56: 1734), 1990.
[3]Percent of original r33 value after heating at 85° C. under vacuum.
[4]Measured by liquid immersion technique at 1.55 μm light (Teng C. C., Applied Optics 32: 1051, 1993).

Figure 6:
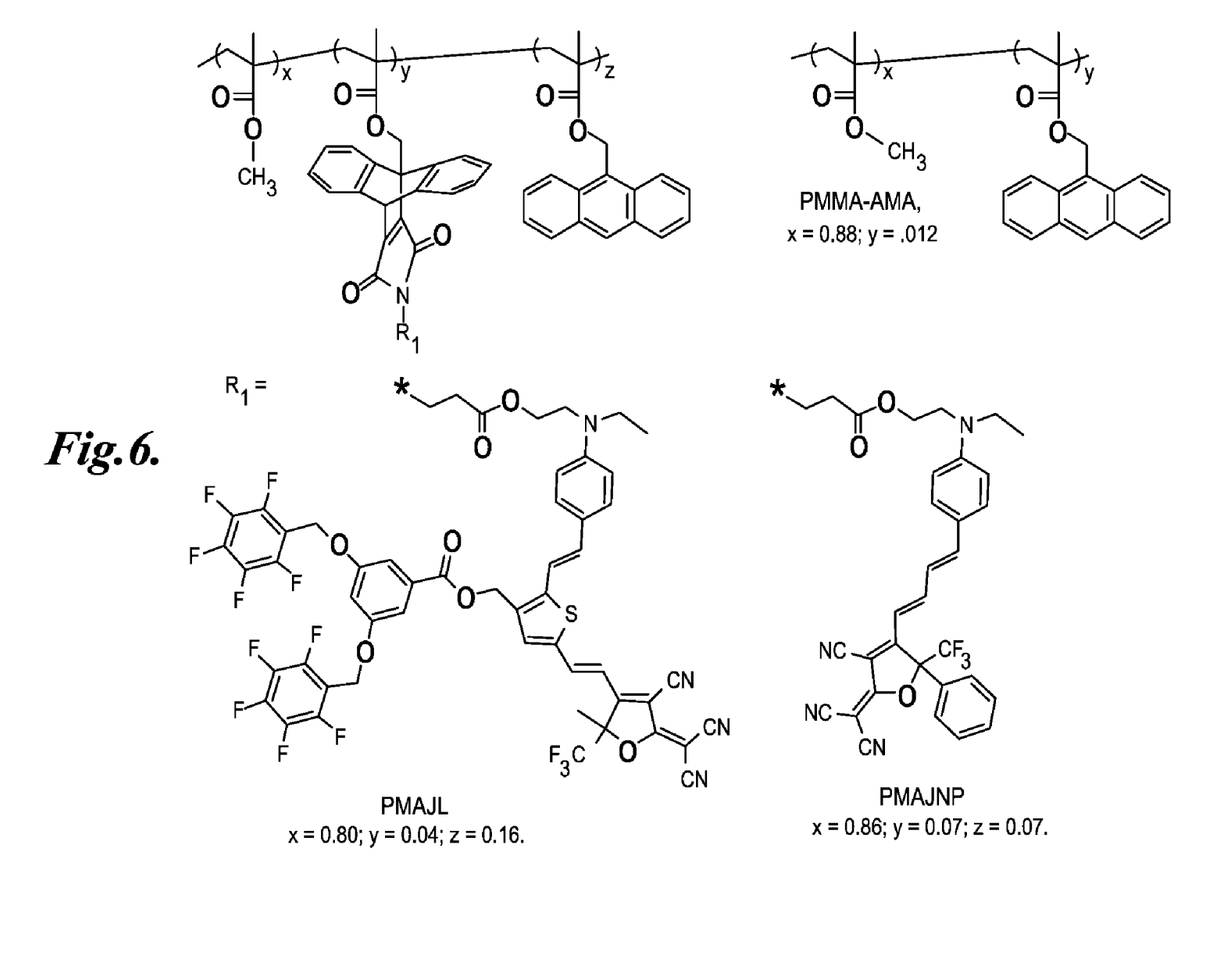
FIG. 6 is a schematic illustration of representative copolymers useful in making a crosslinked film of the invention.

Table 1 compares the characteristics of several representative crosslinked films of the invention with a film having no pendant chromophore moieties (Film 1). Film 1 is a representative example of a crosslinked film that has only guest chromophore molecules in the film (i.e., no grafted chromophores attached to the polymer chains; PMMA-AMA is illustrated in FIG. 6). The remainder of species in Table 1 are representative examples of crosslinked films of the invention that contain both guest chromophores and grafted chromophores attached to polymer chains (PMAJL and PMAJNP are illustrated in FIG. 6). The amount of guest chromophore material (AJL28, as illustrated in FIG. 1) is varied across the species of the table, as is the ratio of crosslinking agents (e.g., BMI or TMI) to anthracene pendant groups. Characteristics of the films in Table 1 include: glass transition temperature ($T_g$); electro-optic coefficient ($r_{33}$); thermal stability; and optical loss. The composition of the films in Table 1 are determined by the amount of guest chromophore in a particular species. For example, Film 5 contains 40 wt % of guest chromophore AJL28 and therefore the remaining ~60 wt % of this material is the host polymer PMAJL (which contains about 4 mol % or 7 wt % chromophoric side chains). The amount of trifunctional TMI crosslinker is typically from diene and a dienophile, where the cycloaddition moieties are formed by the reaction of one or more diene or dienophile moieties of a crosslinkable polymer and one or more diene or dienophile moieties of a crosslinking agent. In one embodiment, the crosslinked polymer has one or more diene groups attached as pendants. In one embodiment, the crosslinked polymer has one or more dienophile groups attached as pendants.

In another aspect, the invention provides electro-optic devices that include the films described above. The materials and methods described herein can be useful in a variety of electro-optic applications. In addition, these materials and methods may be applied to polymer transistors or other active or passive electronic devices, as well as OLED (organic light emitting diode) or LCD (liquid crystal display) applications.

Figure 7:
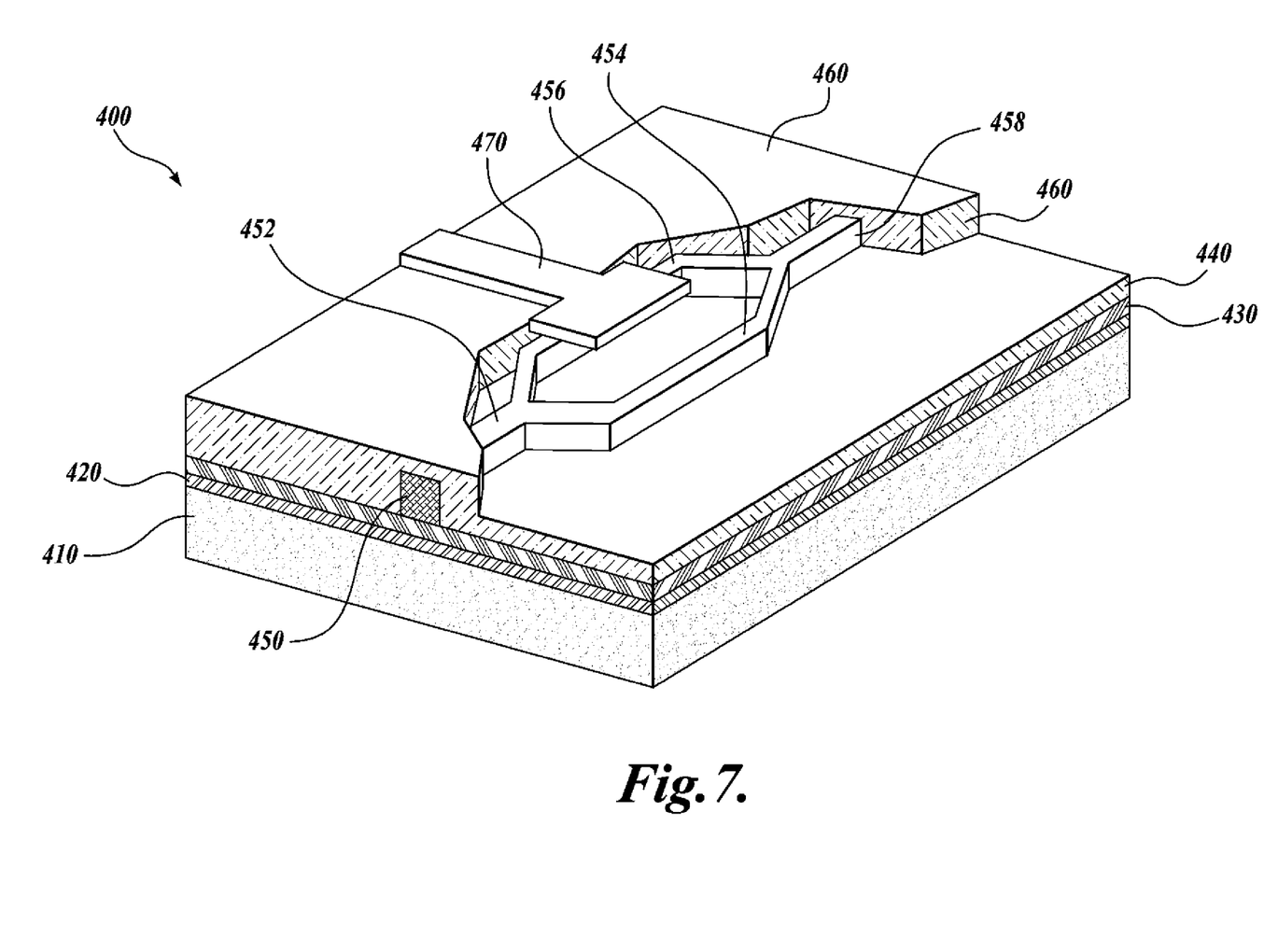
FIG. 7 is a schematic illustration of a representative electro-optic device of the invention.

Representative E-O devices of the invention include E-O modulators, useful in converting electrical signals into optical signals. An exemplary E-O modulator is a Mach-Zehnder (M-Z) interferometer modulator, as illustrated in FIG. 7. The M-Z modulator 400 is typically fabricated on a substrate 410. Representative substrate materials include semiconductors (e.g., silicon wafers), glass, quartz, and polymers. Flexible E-O devices are possible if fabricated on a flexible polymer substrate.

A lower electrode 420 is typically a metal or a conductive polymer. A representative lower electrode material is gold. The lower electrode may be two or more materials, such as is typically the case when using gold as an lower electrode material because of its poor adhesion to typical substrates. Chromium and a mixture of titanium and tungsten are typical adhesion promoting materials used at the interface of the substrate 410 and the lower electrode 420.

The lower cladding layer 430, in-plane cladding layer 440, and upper cladding layer 460 serve as a buffer between the optically detrimental electrodes 420, 470 and the waveguiding layers of the device (such as 450, 452, 456, 458). The in-plane cladding layer 440 and upper cladding layer 460 are typically the same material and deposited in the same fabrication step, thus covering the sides and top of the waveguide materials. Typical cladding materials have a low refractive index relative to waveguiding layers and are know to those skilled in the art.

The active layer 450 comprises an E-O material, such as films of the invention, and is structured in a M-Z modulator to include an input waveguide 452, a non-modulated branch 454, a modulated branch 456, and an output waveguide 458. The active layer 450 is typically poled by heating the entire device 400 while poling the area intermediate the two electrodes 420, 470. The active layer 450 is the waveguiding layer and has a refractive index greater than the surrounding cladding layers 430, 440, 460. The greater the difference in refractive index between the waveguiding and cladding layers, the more tightly the optical signal will be contained in the waveguide. Typically the refractive index difference will be as large as possible so as to reduce optical loss and to sufficiently optically insulate the optical signal from the signal-disrupting electrode materials. A top electrode 470 completes the device.

Operation of a typical M-Z modulator includes inputting an optical signal into the waveguide of the device 450, 452. Representative optical signals include lasers at telecommunication wavelengths (e.g., about 1300 nm and about 1550 nm). Methods for coupling light from the optical signal generator into the device structure are know to those skilled in the art and include butt-coupling and free-space coupling. After coupling light into the device, the optical signal enters the input waveguide 452 where it is split into two branches 454 and 456. If the device is a single-electrode M-Z modulator, as illustrated in FIG. 7, then the E-O effect is used to change the refractive index of the modulated branch 456 of the waveguide. The E-O effect is the result of the application of an electric voltage between the bottom electrode 420 and the top electrode 470 with an E-O material intermediate the electrodes. Because of the speed at which the E-O material can be affected (i.e., the refractive index changed), very high frequency electric signals applied to the electrodes will impart similar frequency signals on the affected E-O material in the modulated branch 456 of the waveguide. When no E-O effect is present (e.g., when there is no voltage across the electrodes 420, 470), constructive interference will occur upon recombination of the two signals in the output waveguide 458, as long as the two branches of the waveguide 454, 456 are of identical dimensions and composition. If the refractive index of the modulated branch 456 is affected via the E-O effect, the refractive index of the branch will increase or decrease. Change in the refractive index in the modulate branch 456 will result in a phase shift and varying degrees of constructive or destructive interference based on the amount of the refractive index shift. A typical M-Z modulator operates in two states, one with no voltage applied (maximum constructive interference), and a second with sufficient voltage applied so as to shift the phase of the modulated branch 456 optical signal π radians ($V_\pi$), thus causing maximum destructive interference. The resulting output is a maximum optical signal with no voltage applied and a minimum optical signal with a voltage applied. Variations of the M-Z modulator are known to those skilled in the art.

In a representative application of a M-Z modulator, the voltage applied to the electrodes is an electrical data stream that is an analog signal, representing 1s and 0s, that is then converted to an optical signal by the M-Z modulator. Conversion is accomplished by defining the optical output of the M-Z modulator to correspond to the electrical input signals. For example, when the analog signal has no voltage (i.e., 0V), this state may represent a 1, and a 0 would be represented by a voltage sufficient to affect the appropriate phase shift (typically $V_\pi$) to create a different optical output than that representing a 1. The electrical input is a series of peaks and valleys representing the 1s and 0s of the data stream. The resulting optical signal output from the M-Z modulator output waveguide 458 is a blinking of the optical signal on (when no voltage is applied) and off (when $V_\pi$ is applied). The frequency of the output signal will match that of the input signal so long as the E-O material used is capable of sufficiently fast refractive index modulation. Because E-O chromophores change refractive index based on the rearrangement of electron density at a molecular level, the maximum speed of an E-O M-Z modulator is not currently known, but terahertz modulation should be possible given proper device design and material considerations.

The E-O material used as the waveguiding layer in M-Z devices will partially define the attributes of the device. The larger the E-O coefficient of the material, the smaller the $V_\pi$ required to drive the modulator. A reduction of $V_\pi$ to sub-1 V levels has been achieved and further reductions in $V_\pi$ will likely be accomplished through an increase in the E-O coefficient of the E-O materials used. Device engineering may further reduce the operating voltage and $V_\pi$ of M-Z modulators. By increasing the complexity of the device and adding a second top electrode 470 covering the portion of the waveguide layer depicted in FIG. 7 as being the non-modulated channel 454, both channels 454, 456 can be modulated, thus potentially reducing the $V_\pi$ of the device.

The use of organic polymers in integrated optics and optical communication systems containing optical fibers and routers has been previously described. The films of the invention may be used in place of currently used materials, such as lithium niobate, in most type of integrated optics devices, optical computing applications, and optical communication systems. For instance, the films may be fabricated into switches, modulators, waveguides, or other electro-optical devices.

For example, in optical communication systems devices fabricated from the films of the invention may be incorporated into routers for optical communication systems or waveguides for optical communication systems or for optical switching or computing applications. Because the films are generally less demanding than currently used materials, devices made from such films may be more highly integrated, as described in U.S. Pat. No. 6,049,641, which is incorporated herein by reference. Additionally, such films may be used in periodically poled applications as well as certain displays, as described in U.S. Pat. No. 5,911,018, which is incorporated herein by reference.

Techniques to prepare components of optical communication systems from optically transmissive materials have been previously described, and may be utilized to prepare such components from films provided by the present invention.

Many articles and patents describe suitable techniques, and reference other articles and patents that describe suitable techniques, where the following articles and patents are exemplary:

Eldada, L. and L. Shacklette, "Advances in Polymer Integrated Optics," *IEEE Journal of Selected Topics in Quantum Electronics* 6(1):54-68, January/February 2000; Wooten, E. L., et al. "A Review of Lithium Niobate Modulators for Fiber-Optic Communication Systems," *IEEE Journal of Selected Topics in Quantum Electronics* 6 (1):69-82, January/February 2000; Heismann, F., et al. "Lithium Niobate Integrated Optics: Selected Contemporary Devices and System Applications," *Optical Fiber Telecommunications III B*, Academic, Kaminow and Koch (eds.), New York, 1997, pp. 377-462; Murphy, E., "Photonic Switching," *Optical Fiber Telecommunications III B*, Academic, Kaminow and Koch (eds.), New York, 1997, pp. 463-501; E. Murphy, *Integrated Optical Circuits and Components: Design and Applications*, Marcel Dekker, New York, August 1999; Dalton, L., et al., "Polymeric Electro-Optic Modulators: From Chromophore Design to Integration with Semiconductor Very Large Scale Integration Electronics and Silica Fiber Optics," *Ind. Eng. Chem. Res.* 38:8-33, 1999; Dalton, L., et al., "From Molecules to Opto-Chips: Organic Electro-Optic Materials," *J. Mater. Chem.* 9:1905-1920, 1999; Liakatas, I. et al., "Importance of Intermolecular Interactions in the Nonlinear Optical Properties of Poled Polymers," *Applied Physics Letters* 76(11): 1368-1370, Mar. 13, 2000; Cai. C., et al., "Donor-Acceptor-Substituted Phenylethenyl Bithiophenes: Highly Efficient and Stable Nonlinear Optical Chromophores," *Organic Letters* 1(11):1847-1849, 1999; Razna, J., et al., "NLO Properties of Polymeric Langmuir-Blodgett Films of Sulfonamide-Substituted Azobenzenes," *J. of Materials Chemistry* 9:1693-1698, 1999; Van den Broeck, K., et al., "Synthesis and Nonlinear Optical Properties of High Glass Transition Polyimides," *Macromol. Chem. Phys* 200:2629-2635, 1999; Jiang, H., and A. K. Kakkar, "Functionalized Siloxane-Linked Polymers for Second-Order Nonlinear Optics," *Macromolecules* 31:2508, 1998; Jen, A. K.-Y., "High-Performance Polyquinolines with Pendent High-Temperature Chromophores for Second-Order Nonlinear Optics," *Chem. Mater.* 10:471-473, 1998; "Nonlinear Optics of Organic Molecules and Polymers," Hari Singh Nalwa and Seizo Miyata (eds.), CRC Press, 1997; Cheng Zhang, Ph.D. Dissertation, University of Southern California, 1999; Galina Todorova, Ph.D. Dissertation, University of Southern California, 2000; U.S. Pat. Nos. 5,272,218; 5,276,745; 5,286,872; 5,288,816; 5,290,485; 5,290,630; 5,290,824; 5,291,574; 5,298,588; 5,310,918; 5,312,565; 5,322,986; 5,326,661; 5,334,333; 5,338,481; 5,352,566; 5,354,511; 5,359,072; 5,360,582; 5,371,173; 5,371,817; 5,374,734; 5,381,507; 5,383,050; 5,384,378; 5,384,883; 5,387,629; 5,395,556; 5,397,508; 5,397,642; 5,399,664; 5,403,936; 5,405,926; 5,406,406; 5,408,009; 5,410,630; 5,414,791; 5,418,871; 5,420,172; 5,443,895; 5,434,699; 5,442,089; 5,443,758; 5,445,854; 5,447,662; 5,460,907; 5,465,310; 5,466,397; 5,467,421; 5,483,005; 5,484,550; 5,484,821; 5,500,156; 5,501,821; 5,507,974; 5,514,799; 5,514,807; 5,517,350; 5,520,968; 5,521,277; 5,526,450; 5,532,320; 5,534,201; 5,534,613; 5,535,048; 5,536,866; 5,547,705; 5,547,763; 5,557,699; 5,561,733; 5,578,251; 5,588,083; 5,594,075; 5,604,038; 5,604,292; 5,605,726; 5,612,387; 5,622,654; 5,633,337; 5,637,717; 5,649,045; 5,663,308; 5,670,090; 5,670,091; 5,670,603; 5,676,884; 5,679,763; 5,688,906; 5,693,744; 5,707,544; 5,714,304; 5,718,845; 5,726,317; 5,729,641; 5,736,592; 5,738,806; 5,741,442; 5,745,613; 5,746,949; 5,759,447; 5,764,820; 5,770,121; 5,76,374; 5,776,375; 5,777,089; 5,783,306; 5,783,649; 5,800,733; 5,804,101; 5,807,974; 5,811,507; 5,830,988; 5,831,259; 5,834,100; 5,834,575; 5,837,783; 5,844,052; 5,847,032; 5,851,424; 5,851,427; 5,856,384; 5,861,976; 5,862,276; 5,872,882; 5,881,083; 5,882,785; 5,883,259; 5,889,131; 5,892,857; 5,901,259; 5,903,330; 5,908,916; 5,930,017; 5,930,412; 5,935,491; 5,937,115; 5,937,341; 5,940,417; 5,943,154; 5,943,464; 5,948,322; 5,948,915; 5,949,943; 5,953,469; 5,959,159; 5,959,756; 5,962,658; 5,963,683; 5,966,233; 5,970,185; 5,970,186; 5,982,958; 5,982,961; 5,985,084; 5,987,202; 5,993,700; 6,001,958; 6,005,058; 6,005,707; 6,013,748; 6,017,470; 6,020,457; 6,022,671; 6,025,453; 6,026,205; 6,033,773; 6,033,774; 6,037,105; 6,041,157; 6,045,888; 6,047,095; 6,048,928; 6,051,722; 6,061,481; 6,061,487; 6,067,186; 6,072,920; 6,081,632; 6,081,634; 6,081,794; 6,086,794; 6,090,322; and 6,091,879.

The foregoing references provide instruction and guidance to fabricate waveguides from materials generally of the types described herein using approaches such as direct photolithography, reactive ion etching, excimer laser ablation, molding, conventional mask photolithography, ablative laser writing, or embossing (e.g., soft embossing). The foregoing references also disclose electron donors and electron bridges that may be incorporated into the films of the invention.

Components of optical communication systems that may be fabricated, in whole or part, with the films according to the present invention include, without limitation, straight waveguides, bends, single-mode splitters, couplers (including directional couplers, MMI couplers, star couplers), routers, filters (including wavelength filters), switches, modulators (optical and electro-optical, e.g., birefringent modulator, the Mach-Zehnder interferometer, and directional and evanescent coupler), arrays (including long, high-density waveguide arrays), optical interconnects, optochips, single-mode DWDM components, photonic crystal devices, resonant devices (e.g., photonic crystal, ring, or disc resonators, and gratings. The films described herein may be used with, for example, wafer-level processing, as applied in, for example, vertical cavity surface emitting laser (VCSEL) and CMOS technologies.

In many applications, the films described herein may be used in lieu of lithium niobate, gallium arsenide, and other inorganic materials that currently find use as light-transmissive materials in optical communication systems.

The films described herein may be used in telecommunication, data communication, signal processing, information processing, and radar system devices and thus may be used in communication methods relying, at least in part, on the optical transmission of information. Thus, a method according to the present invention may include communicating by transmitting information with light, where the light is transmitted at least in part through a film of the invention or related macrostructure.

The films of the invention can be incorporated into various electro-optical devices. Accordingly, in another aspect, the invention provides electro-optic devices including the following:

an electro-optical device including a film according to the invention;

a waveguide including a film according to the invention;

an optical switch including a film according to the invention;

an optical modulator including a film according to the invention;

an optical coupler including a film according to the invention;

an optical router including a film according to the present invention;

a communications system including a film of the invention;

a method of data transmission including transmitting light through or via a film of the invention;

a method of telecommunication including transmitting light through or via a film of the invention;

a method of transmitting light including directing light through or via a film of the invention;

a method of routing light through an optical system including transmitting light through or via a film of the invention;

an interferometric optical modulator or switch, including: (1) an input waveguide; (2) an output waveguide; (3) a first leg having a first end and a second end, the first leg being coupled to the input waveguide at the first end and to the output waveguide at the second end; and 4) and a second leg having a first end and a second end, the second leg being coupled to the input waveguide at the first end and to the output waveguide at the second end, wherein at least one of the first and second legs includes a film of the invention;

an optical modulator or switch, including: (1) an input; (2) an output; (3) a first waveguide extending between the input and output; and (4) a second waveguide aligned to the first waveguide and positioned for evanescent coupling to the first waveguide; wherein at least one of the first and second legs includes a film of the invention, the modulator or switch may further including an electrode positioned to produce an electric field across the first or second waveguide; and an optical router including a plurality of switches, wherein each switch includes: (1) an input; (2) an output; (3) a first waveguide extending between the input and output; and (4) a second waveguide aligned to the first waveguide and positioned for evanescent coupling to the first waveguide; wherein at least one of the first and second legs includes a film of the invention, the plurality of switches may optionally be arranged in an array of rows and columns.

The following example is provided for the purpose of illustrating, not limiting, the invention.

EXAMPLE

The Preparation of a Representative Crosslinked Polymer Film

Host Crosslinked Polymer Having a Pendant Chromophore Moiety with Nonlinear Optical Chromophore Guest In this example, the preparation of a representative crosslinked polymer film of the invention including a crosslinked polymer host and a nonlinear optical chromophore guest is described. In this embodiment, the crosslinked polymer host is a graft copolymer having a pendant nonlinear optically active chromophore moiety. The film is made by crosslinking a mixture of a crosslinkable graft copolymer having a pendant diene moiety and a pendant nonlinear optically active chromophore moiety (PM-AJLO4), a crosslinking agent having three dienophiles (a trismaleimide, TMI), and a nonlinear optically active chromophore (AJL28). A schematic illustration of the method is illustrated in FIG. 5.

Figure 3:
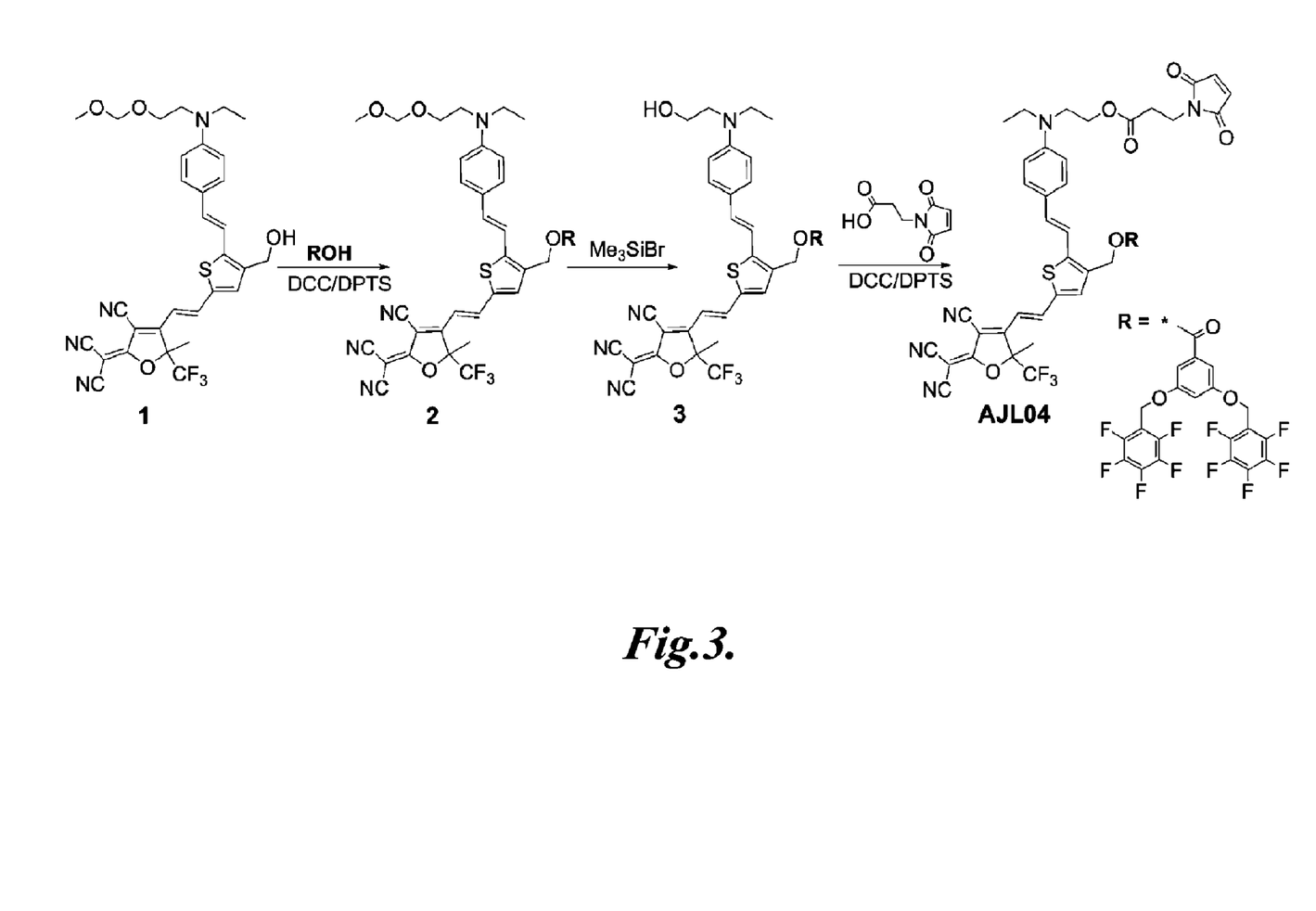
FIG. 3 is a schematic illustration of the synthesis of a chromophore compound having a dienophile useful for grafting to a polymer having a diene for making a crosslinkable graft copolymer of the invention.
Figure 4:
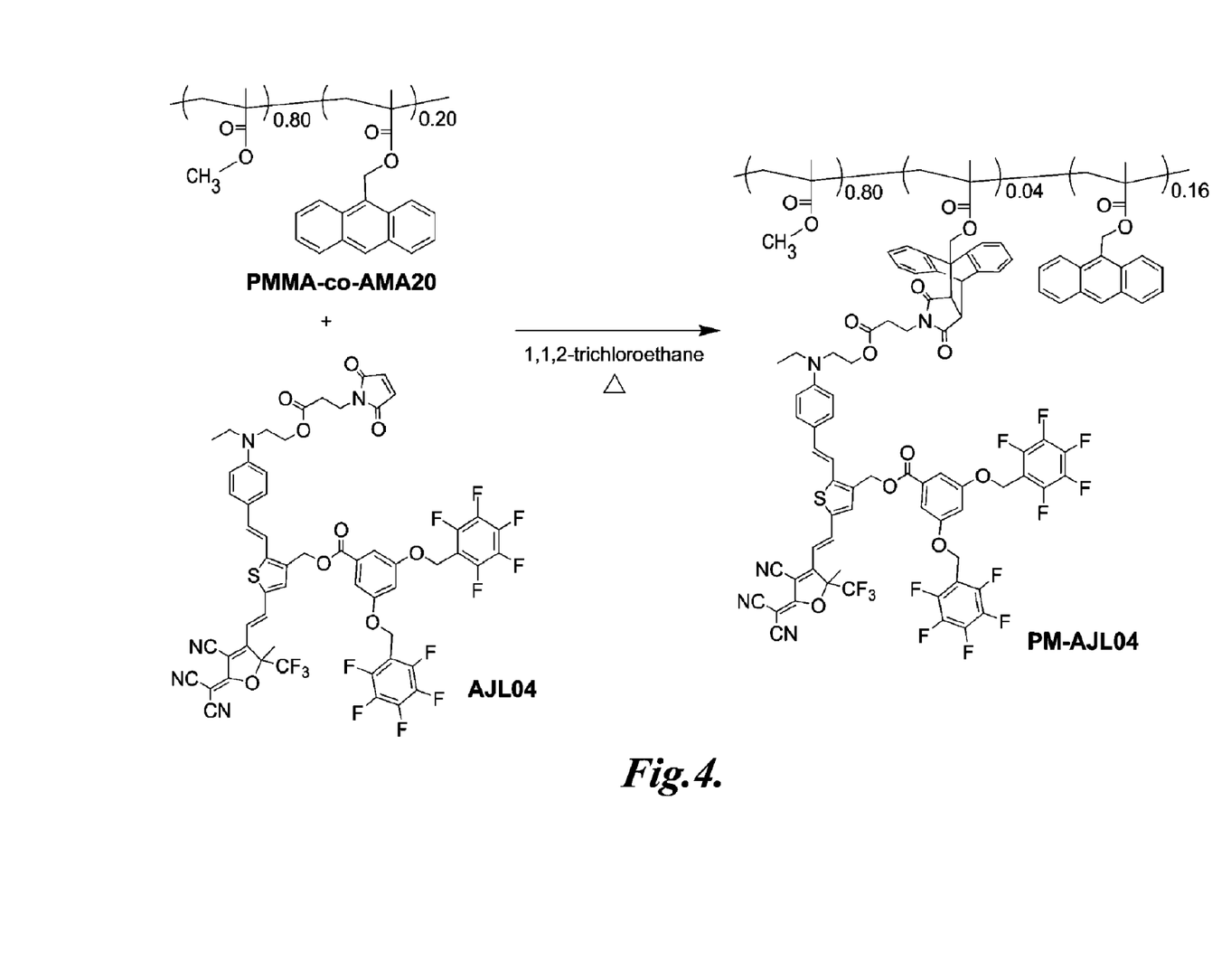
FIG. 4 is a schematic illustration of the synthesis of a representative crosslinkable graft copolymer of the invention useful for making a crosslinked film of the invention.

The crosslinkable graft copolymer was prepared by copolymerizing 9-anthrylmethyl methacrylate (AMA) and methylmethacrylate (MA), and reacting the resulting copolymer having a pendant diene moiety with a chromophore having a dienophile group to provide a graft copolymer having a pendant diene moiety and chromophore moiety. The preparation of the crosslinkable graft copolymer is illustrated in FIGS. 2-4.

General Procedures. Dichloromethane ($CH_2Cl_2$) and tetrahydrofuran (THF) were distilled over phosphorus pentoxide and sodium benzophenone ketyl, respectively, under nitrogen prior to use. Diethyl-[2-(tert-butyldimethylsiloxymethyl)thien-1-yl]-methylphosphonate (Compound I) (Y. Honda, I. Fukuchi, M. Taya, A. K.-Y. Jen, U.S. Pat. No. 5,834,575), 4-[ethyl-(2-methoxymethoxy-ethyl)-amino]benzaldehyde (Compound II) (S. Liu, T. Sassa, H. Ma, A. K-Y. Jen, L. R. Dalton, *Proc. SPIE* 4798:133, 2002), 2-dicyanomethylene-3-cyano-4,5-dimethyl-5-trifluoromethyl-2,5-dihydrofuran (Compound V) (D. H. Rich, P. D. Gesellchen, A. Tong, A. Cheung, C. K. Buckner, *J. Med. Chem.* 18:1004, 1975), 3-maleimido-propionic acid (MPA) (S. Liu, M. A. Haller, H. Ma, L. R. Dalton, S.-H. Jang, A. K.-Y. Jen, *Adv. Mater.* 15:603, 2003), 3,5-bispentafluorophenylmethoxybenzoic acid (PFBA) (S. H. Kang, J. Luo, H. Ma, R. R. Barto, C. W. Frank, L. R. Dalton, A. K.-Y. Jen, *Macromolecules* 36:4355, 2003), 4-(dimethylamino)pyridinium-4-toluenesulfonate (DPTS) (J. S. Moore, S. I. Stupp, *Macromolecules* 23:70, 1990), and tris(2-maleimidoethyl)amine (TMI) (X. Chen, M. A. Dam, K. Ono, A. Mal, H, Shen, S. R. Nutt, K. Sheran, F. Wudl, *Science* 295:1698, 2002) were prepared according to the methods described in the literature. All reactions were carried out under inert nitrogen atmosphere.

The Synthesis of Nonlinear Optically Active Chromophore (Compound 1)

Figure 2:
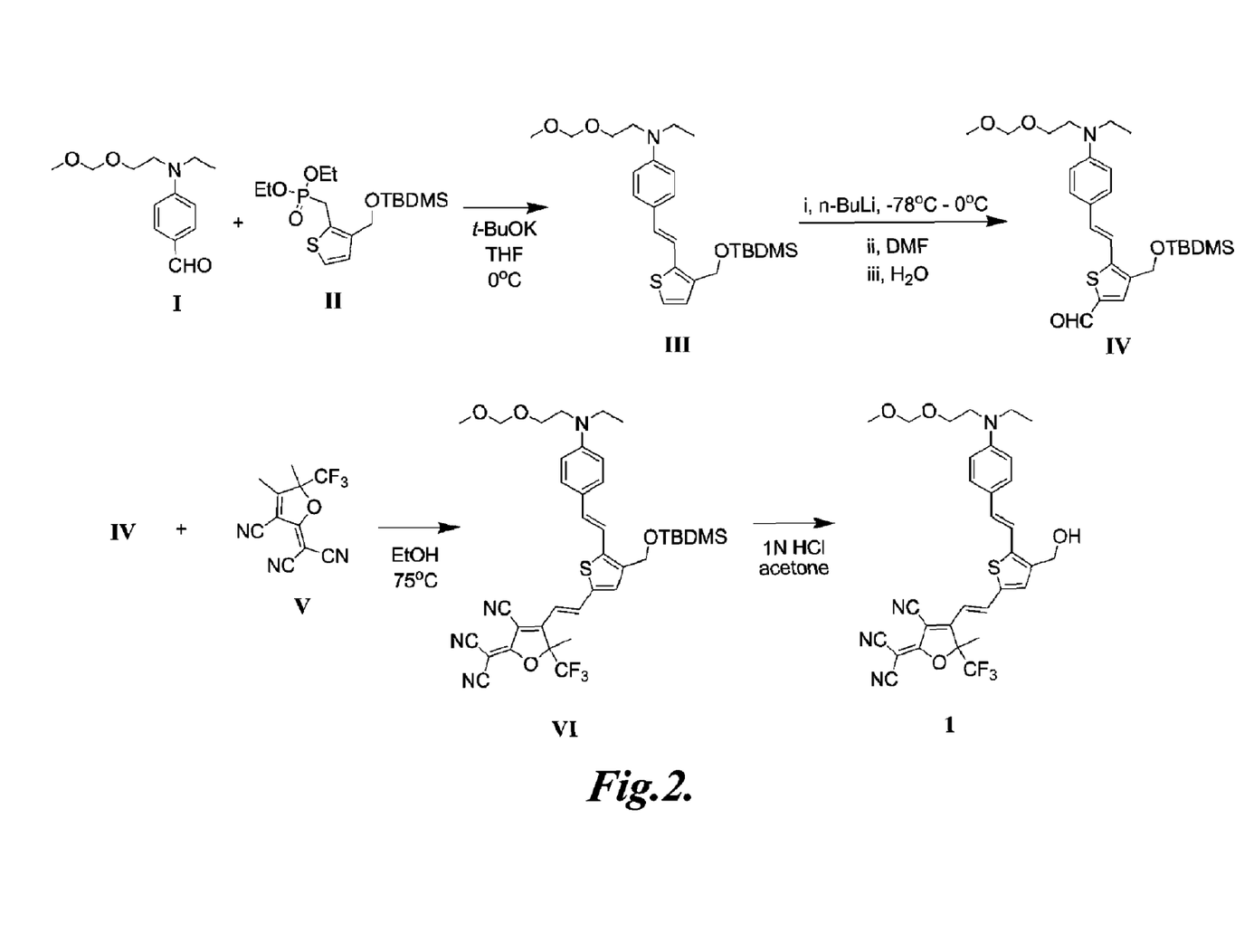
FIG. 2 is a schematic illustration of the synthesis of a chromophore compound useful for making a chromophore compound having a dienophile useful for grafting to a polymer having a diene for making a crosslinkable graft copolymer of the invention.

The synthesis of a representative chromophore (Compound 1) useful in making a crosslinkable polymer of the invention is illustrated schematically in FIG. 2.

Compound III. A solution of I (2.60 g, 11 mmol) and II (4.55 g, 12 mmol) in 20 mL of THF was cooled to 0° C. 15 mL of potassium tert-butoxide (1 M, 15 mmol) was added into the solution in three portions. The reaction mixture was stirred at 0° C. for 2 hours, warmed up to room temperature, stayed for 2 hours and quenched with 2 mL of water. THF was removed by rotary evaporation and the residue was purified via flash chromatography on silica gel with a gradient eluent of hexane to 5% ethyl acetate in hexane to afford Compound III as a viscous oil (4.90 g, 97%). $^1$H NMR (CDCl$_3$, TMS, ppm): δ 7.37 (d, J=8.9 Hz, 2H), 7.13 (d, J=15.9 Hz, 2H), 7.07, (d, J=5.2 Hz, 2H), 7.01 (d, J=5.2 Hz, 2H), 6.86 (d, J=15.9 Hz, 1H), 6.71 (d, J=8.9 Hz, 2H), 4.79 (s, 2H), 4.65 (s, 2H), 3.74 (t, J=6.3 Hz, 2H), 3.58 (t, J=6.3 Hz, 2H), 3.50 (q, J=7.0 Hz, 2H), 3.38 (s, 3H), 1.26 (t, J=7.0 Hz, 3H), 0.94 (s, 9H), 0.12 (s, 6H).

Compound IV. A solution of Compound III (4.7 g, 10.0 mmol) in 20 mL of THF was cooled to −78° C. 4.7 mL of n-butyllithium (2.5 M, 11.7 mmol) was added dropwise. After this addition the solution was stirred for 1 hour each at −78° C. and at 0° C. The solution was cooled to −78° C. and treated with DMF (2.0 g, 27.0 mmol) in 2 mL of THF. The reaction mixture was stirred for 2 hours at −78° C. and warmed up to room temperature. After stirring for an additional 2 hours, 2.0 mL of water was added to quench the reaction. The resulting mixture was stirred overnight to allow the completion of the reaction. After THF was removed, the residue was washed with water and extracted with $CH_2Cl_2$. The combined organic layers were dried over $Na_2SO_4$ and concentrated. The crude product was purified via flash chromatography on silica gel with a gradient eluent of hexane to 5% ethyl acetate in hexane to give IV as red oil (4.3 g, 87%). $^1$H NMR (CDCl$_3$, TMS, ppm): δ 9.78 (s, 1H), 7.63 (s, 1H), 7.39 (d, J=8.7 Hz, 2H), 7.03, (s, 2H), 6.70 (d, J=8.7 Hz, 2H), 4.76 (s, 2H), 4.63 (s, 2H), 3.73 (t, J=6.3 Hz, 2H), 3.58 (t, J=6.3 Hz, 2H), 3.50 (q, J=7.0 Hz, 2H), 3.35 (s, 3H), 1.21 (t, J=7.0 Hz, 3H), 0.94 (s, 9H), 0.12 (s, 6H).

Compound VI. A solution of IV (3.8 g, 7.8 mmol) and V (2.0 g, 7.9 mmol) in 50 mL of EtOH was refluxed for 2 hours. Organic solvent was removed via rotary evaporation. The resulting residue was purified through flash chromatography on silica gel with a gradient eluent of hexane/$CH_2Cl_2$ (4/1 to 1/2) to give VI as a red solid (3.6 g, 65%). $^1$H NMR ($CDCl_3$, TMS, ppm): δ 8.12 (d, J=15.3 Hz, 1H), 7.45 (s, 1H), 7.43 (d, J=8.7 Hz, 2H), 7.13 (s, 2H), 6.77 (d, J=8.7 Hz, 2H), 6.50 (d, J=15.3 Hz, 1H), 4.75 (s, 2H), 4.62 (s, 2H), 3.75 (t, J=6.3 Hz, 2H), 3.61 (t, J=6.3 Hz, 2H), 3.53 (q, J=7.0 Hz, 2H), 3.36 (s, 3H), 1.93 (s, 3H), 1.25 (t, J=7.0 Hz, 3H), 0.95 (s, 9H), 0.15 (s, 6H).

Compound 1. A solution of VI (3.6 g, 4.9 mmol) in 25 mL of acetone was treated with 10 mL of 1N HCl aq. The solution was stirred at room temperature and monitored by thin layer chromatography. Upon optimal yield (2 h), the solution was neutralized by sodium bicarbonate. The resulting mixture was stirred for an hour. Organic solvent was removed via rotary evaporation. The residue was dissolved in 20 mL of water and extracted with 50 mL of $CH_2Cl_2$. Organic layers were combined, dried over $Na_2SO_4$ and concentrated. The crude product was purified via flash chromatography on silica gel with a gradient eluent of dichloromethane/ethyl acetate (10/1 to 5/1) to obtain Compound 1 (2.7 g, 91%). $^1$H NMR ($CDCl_3$, TMS, ppm): δ 8.14 (d, J=15.3 Hz, 1H), 7.52 (s, 1H), 7.45 (d, J=8.7 Hz, 2H), 7.14 (s, 2H), 6.75 (d, J=8.7 Hz, 2H), 6.50 (d, J=15.3 Hz, 1H), 4.78 (d, J=5.4 Hz, 2H), 4.66 (s, 2H), 3.75 (t, J=6.3 Hz, 2H), 3.62 (t, J=6.3 Hz, 2H), 3.54 (q, J=7.0 Hz, 2H), 3.36 (s, 3H), 1.93 (s, 3H), 1.26 (t, J=7.0 Hz, 3H). ESI-MS (m/z): Calcd.: 610.2. Found: 610.1. Anal. Calcd for $C_{31}H_{29}F_3N_4O_4S$: C, 60.97; H, 4.79; N, 9.17. Found: C, 61.13; H, 4.86; N, 9.15.

The Synthesis of a Nonlinear Optically Active Chromophore Having a Dienophile Moiety (AJL04)

The synthesis of a representative chromophore having a dienophile moiety (AJL04) for coupling to a copolymer having a pendant diene moiety useful for making the crosslinkable polymer of the invention is illustrated schematically in FIG. 3.

Compound 2. To a solution of 1 (1.50 g, 2.46 mmol), PFBA (1.64 g, 3.19 mmol), and DPTS (0.10 g, 0.383 mmol) in 50 mL of THF was added DCC (Dicyclohexylcarbodiimide; 0.79 g, 3.83 mmol). The reaction mixture was allowed to stir at room temperature for 6 h under nitrogen atmosphere. After filtration of the resultant urea, all solvent was evaporated under reduced pressure. The crude product was purified by column chromatography using ethyl acetate and hexane (1:2, by volume) as an eluent to afford 2 as blue solid (2.56 g, 87%). $^1$H NMR ($CDCl_3$, TMS, ppm): δ 8.09 (d, J=15.3 Hz, 1H), 7.54 (s, 1H), 7.44 (d, J=8.7 Hz, 2H), 7.35 (s, 2H), 7.26 (d, J=15.6 Hz, 1H), 7.18 (d, J=15.6 Hz, 1H), 6.76 (s, 1H), 6.74 (d, J=8.7 Hz, 2H), 6.56 (d, J=15.3 Hz, 1H), 5.43 (s, 2H), 5.11 (s, 4H), 4.63 (s, 2H), 3.70 (t, J=6.3 Hz, 2H), 3.66 (t, J=6.3 Hz, 2H), 3.55 (q, J=7.0 Hz, 2H), 3.33 (s, 3H), 1.95 (s, 3H), 1.24 (t, J=7.0 Hz, 3H). ESI-MS (m/z): Calcd.: 1106.2. Found: 1106.1. Anal. Calcd for $C_{52}H_{35}F_{13}N_4O_7S$: C, 56.42; H, 3.19; N, 5.06. Found: C, 56.48; H, 3.19; N, 5.01.

Compound 3. To a cooled solution of 2 (2.20 g, 1.99 mmol) in 20 mL of $CH_2Cl_2$ under the nitrogen, 5.0 mL of bromotrimethylsilane was added dropwise. The reaction mixture was stirred at −20° C. for 2.5 h, and then neutralized with 50 mL of saturated aqueous sodium bicarbonate solution. The residue was partitioned between water and $CH_2Cl_2$, and extracted. The combined extracts were dried over sodium sulfate. The crude product was purified by column chromatography using ethyl acetate and hexane (3:2, by volume) to obtain 3 as a blue-greenish solid (1.75 g, 83%). $^1$H NMR ($CDCl_3$, TMS, ppm): δ 8.08 (d, J=15.3 Hz, 1H), 7.54 (s, 1H), 7.45 (d, J=8.7 Hz, 2H), 7.35 (s, 2H), 7.28 (d, J=15.6 Hz, 1H), 7.18 (d, J=15.6 Hz, 1H), 6.77 (s, 1H), 6.76 (d, J=8.7 Hz, 2H), 6.54 (d, J=15.3 Hz, 1H), 5.43 (s, 2H), 5.11 (s, 4H), 3.85 (t, J=6.3 Hz, 2H), 3.58-3.50 (m, 4H), 1.94 (s, 3H), 1.23 (t, J=7.0 Hz, 3H). ESI-MS (m/z): Calcd.: 1062.18. Found: 1062.20. Anal. Calcd for $C_{50}H_{31}F_{13}N_4O_6S$: C, 56.50; H, 2.94; N, 5.27. Found: C, 56.50; H, 2.91; N, 5.26.

AJL04. AJL04 was synthesized with a similar procedure as described for Compound 2 using 0.50 g (0.47 mmol) of 3 and 0.16 g (0.96 mmol) of MPA instead of 1 and PFBA. The crude product was purified by column chromatography using $CH_2Cl_2$ and ethyl acetate (3:1, by volume) as the eluent to afford AJL04 as blue-greenish solid (0.50 g, 88%). $^1$H NMR ($CDCl_3$, TMS, ppm): δ 8.09 (d, J=15.3 Hz, 1H), 7.58 (s, 1H), 7.46 (d, J=8.7 Hz, 2H), 7.35 (s, 2H), 7.28 (d, J=15.6 Hz, 1H), 7.22 (d, J=15.6 Hz, 1H), 6.78 (d, J=8.7 Hz, 2H), 6.76 (s, 1H), 6.71 (s, 2H), 6.55 (d, J=15.3 Hz, 1H), 5.44 (s, 2H), 5.12 (s, 4H), 4.27 (t, J=6.3 Hz, 2H), 3.85 (t, J=6.9 Hz, 2H), 3.62 (t, J=6.3 Hz, 2H), 3.47 (q, J=7.0 Hz, 2H), 2.65 (t, J=6.9 Hz, 2H), 1.95 (s, 3H), 1.26 (t, J=7.0 Hz, 3H). ESI-MS (m/z): Calcd.: 1213.2. Found: 1213.1. Anal. Calcd for $C_{57}H_{36}F_{13}N_5O_9S$: C, 56.39; H, 2.99; N, 5.77. Found: C, 56.31; H, 3.03; N, 5.86.

The Preparation of a Representative Crosslinkable Graft Copolymer (PM-AJL04)

The preparation of a representative crosslinked film from a crosslinkable graft copolymer having a pendant diene moiety and a chromophore moiety (PM-AJL04) is illustrated schematically in FIG. 4.

PMMA-AMA20. A solution of 830 mg (8.3 mmol) of MMA, 573 mg (2.08 mmol) of AMA, and 10 mg (0.06 mmol) of AIBN in 4 mL of THF was degassed using the freeze-pump-thaw procedure three times and filled with nitrogen. The solution was first heated at 55° C. for 2 hours and then at 62° C. for 12 hours. The viscous solution was poured into 100 mL methanol to precipitate the polymer. The polymer was redissolved in THF and reprecipitated twice into methanol to yield 1.0 g (71%) of the polymer. $^1$H NMR ($CDCl_3$, TMS, ppm): δ 8.60-8.10 (br m), 8.10-7.80 (br m), 7.65-7.20 (br m), 6.20-5.80 (br s), 3.70-3.05 (br m), 2.15-1.50 (br m), 1.15-0.50 (br m). Molecular weight: $M_n$=40,000 with a polydispersity of 2.22.

PM-AJL04. To a solution of 0.80 g (5.92 mmol) of PMMA-AMA20 in 5 mL of 1,1,2-trichloroethane was added 0.20 g (0.16 mmol) of AJL04 and dissolved at room temperature for 30 min. The reaction mixture was refluxed at 120° C. for 3 h, and concentrated under the vacuum. The polymer was isolated through precipitation of the filtered solution in hot methanol. Further purification was conducted by redissolving the polymer in $CH_2Cl_2$, filtering, and reprecipitating to afford the polymer PM-AJL04. $^1$H NMR ($CDCl_3$, TMS, ppm): δ 8.60-8.10 (br m), 8.10-7.80 (br m), 7.60-7.20 (br m), 7.20-7.10 (br m), 6.80-6.49 (br m), 6.10-5.80 (br s), 5.45 (br s), 5.05 (br s), 4.81 (br s), 4.25 (br s), 3.80-3.10 (br m), 2.12-1.77 (br m), 1.37-1.21 (br m), 1.12-0.87 (br s), 0.85-0.59 (br s).

The Preparation of a Representative Crosslinked Polymer Film of the Invention Including a Crosslinked Polymer Host and a Nonlinear Optical Chromophore Guest The preparation of a representative crosslinked film from a crosslinkable graft copolymer having a pendant diene moiety and a chromophore moiety (PM-AJL04), a crosslinking agent (a trismaleimide, TMI), and a nonlinear optically active chromophore (AJL28 or AJC146) is illustrated schematically in FIG. 5.

A mixture of 60 mg of PM-AJL04, 6 mg of TMI, 40 mg of AJL28 was dissolved in 1.2 g of distilled 1,1,2-trichloroethane (~8 wt %) for 6 hours. The homogeneous solution was filtered through 0.2 μm of poly(tetrafluoroethylene) (PTFE) filter and spin-coated onto an indium tin oxide (ITO) glass substrates. The film thickness was controlled to be about 1.0 μm by a using 1000 rpm spin speed. The spin-coated films were dried under vacuum for 10 hours at 50° C. and were stored under vacuum at room temperature. A thin layer of gold was then sputtered onto the films as the top electrode for poling. Film were poled with the following profile: 75 V/μm at 50° C., 5° C./min ramping to 135° C. The poling voltage was slowly increased to 125 V/μm from about 105° C. to about 125° C. The voltage was maintained until 135° C. and also during cooling to room temperature. The E-O properties and temporal stability of representative films are summarized in Table 1. The electro-optic (E-O) coefficient values were measured using the reflection technique at 1310 nm light according to Teng, C. C., Man, H. T., *Appl. Phys. Lett.* 56:1734, 1990.

While illustrative embodiments have been illustrated and described, it will be appreciated that various changes can be made therein without departing from the spirit and scope of the invention.

The embodiments of the invention in which an exclusive property or privilege is claimed are defined as follows:

1. A film having electro-optic activity, comprising a plurality of aligned, polarizable chromophore compounds and a host matrix, wherein the host matrix comprises crosslinked polymers having a plurality of aligned polarizable chromophore moieties, wherein the crosslinked polymers comprise one or more 4+2 cycloaddition crosslinks, wherein each crosslink is formed by 4+2 cycloaddition between a crosslinkable polymer having a plurality of polarizable chromophore moieties and a crosslinking agent that does not include a polarizable chromophore.

2. The film of claim 1, wherein the 4+2 cycloaddition crosslink is the product of the reaction of a diene and a dienophile.

3. The film of claim 2, wherein the diene is an anthracene.

4. The film of claim 2, wherein the dienophile is a maleimide.

5. The film of claim 1, wherein the chromophore compound is a nonlinear optically active compound.

6. The film of claim 1, wherein the crosslinked polymers having a plurality of aligned polarizable chromophore moieties are crosslinked polymethylmethacrylate-co-9-anthrylmethyl methacrylate copolymers.

7. The film of claim 1 having an $r_{33}$ value of from about 300 to about 380 pm/V.

8. The film of claim 1, wherein the chromophore compounds are present in an amount from about 20 to about 50 percent by weight based on the total weight of the host matrix.

9. The film of claim 1, wherein the crosslinked polymers having a plurality of aligned polarizable chromophore moieties are graft copolymers having pendant chromophore moieties.

10. The film of claim 9, wherein the graft copolymers having pendant chromophore moieties have from about 5 to about 30 percent by weight chromophore moieties based on the total weight of the polymers.

11. The film of claim 9, wherein the chromophore compounds and pendant chromophore moieties are present in a combined amount from about 5 to about 60 percent by weight based on the total weight of the film.

12. An electro-optic device, comprising the film of claim 1.

* * * * *